United States Patent

Killion et al.

[15] 3,680,111
[45] July 25, 1972

[54] RADIOMETRIC AIRCRAFT LANDING SYSTEM

[72] Inventors: Derling G. Killion; Frank J. Janza, both of San Diego, Calif.

[73] Assignee: Teledyne Ryan Aeronautical Company, San Diego, Calif.

[22] Filed: Oct. 12, 1970

[21] Appl. No.: 79,894

[52] U.S. Cl..................343/100 ME, 343/5 LS, 343/108 R
[51] Int. Cl..........................................................G01w 1/00
[58] Field of Search..................343/100 ME, 100 PE, 108 R, 343/5 LS

[56] References Cited

UNITED STATES PATENTS 2,458,654   1/1949   Southworth..................343/100 ME X
2,502,974   4/1950   McElhannon.....................343/108 R Primary Examiner—Benjamin A. Borchelt
Assistant Examiner—Richard E. Berger
Attorney—Carl R. Brown, Stephen L. King and Kenneth W. Mateer

[57] ABSTRACT

An aircraft landing system employing passive radiometer apparatus mounted in an aircraft to scan a specially arranged ground target, which will provide directional and altitude guidance in the vicinity of an airfield. The ground target extends along the desired flight path and is designed to cause large differences between horizontally and vertically polarized radiometric noise, easily detected and analyzed by the radiometer. Portions of the ground target may have augmented noise sources in specific patterns, for marking and identification purposes. The radiometer output can provide visual or audible aid to manual control, or be used to operate an automatic pilot, or the like.

10 Claims, 6 Drawing Figures

PATENTED JUL 25 1972 3,680,111

INVENTORS
DERLING G. KILLION
FRANK J. JANZA
BY
*Carl R. Brown*
ATTORNEY

RADIOMETRIC AIRCRAFT LANDING SYSTEM

BACKGROUND OF THE INVENTION

Landing aid systems for aircraft usually involve a guiding beam transmitted from ground based apparatus from precise alignment with the runway. The aircraft carries receiving equipment compatible with the ground based transmitter, and deviations of the aircraft from the prescribed flight path are indicated by changes in characteristics of the received signals. The ground based transmitter capable of producing suitable signals is complex and expensive and requires careful installation and frequent maintenance. As a result, such apparatus is not usually found at small airfields or temporary landing strips, where the aid would be valuable. Further, since several different types of beam guidance landing aids are in present use, an aircraft must carry receiving means compatible with each type to be operable at many different locations.

An ideal system would have one simple type of apparatus carried by an aircraft, compatible with ground based means which is easily installed to suit a specific location, requires no power supply and almost no maintenance.

SUMMARY OF THE INVENTION

The aircraft landing system described herein utilizes a passive ground target assembly in the form of a conductive grating, designed to provide a large difference between horizontally and vertically polarized radiometric noise. In the aircraft, a passive scanning radiometer detects the noise from the ground target and analyzes the results to provide directional and altitude data. The conductive grating extends along the required flight path to the runway and may take the form of metals slats or rods secured just above the ground surface on individual or common supports. In a very simple form the slats can be metallized strips on a non-conductive backing strip, such as Mylar or other suitable plastic, which is easily spread in position and can be rolled up after use for a temporary landing strip.

Patterns or characters can be incorporated in the ground target, by varying the grating or by means of noise augmenting elements, such as lamps, between the slats. Specific characters can be read by a suitable radiometer and can serve as identification or position markers. The system is adaptable to radio frequency, infrared, or other radiometric frequency bands.

The primary object of this invention, therefore, is to provide a new and improved radiometric aircraft landing system.

Another object of this invention is to provide an aircraft landing system, in which a simple passive radiometer unit carried in an aircraft is compatible with a variety of ground targets or markers.

Another object of this invention is to provide an aircraft landing system in which the ground target is essentially passive and is easily installed in a permanent or temporary manner in any desired location.

A further object of this invention is to provide an aircraft landing system which is adaptable to substantially all existing aircraft and landing fields, without interfering with operation of the aircraft or other facilities.

Other objects and many advantages of this invention will become more apparent upon a reading of the following detailed description and an examination of the drawings, wherein like reference numerals designate like parts throughout and in which.

DESCRIPTION OF THE PREFERRED EMBODIMENT

Figure 2:
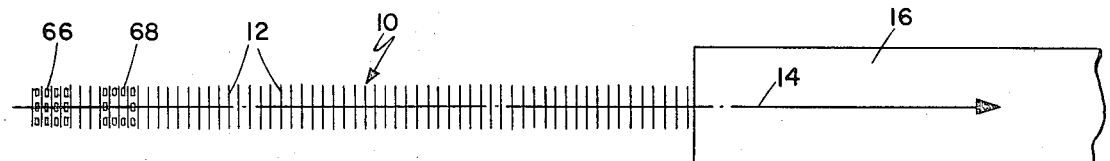
FIG. 2 is a diagrammatic plan view of a typical ground target and runway arrangement.

The basic ground target 10, shown in FIG. 2, is an elongated grating composed of parallel conductive slats 12 spaced along a flight path indicated by broken line 14, which leads to a runway 16. Slats 12 are substantially parallel to the ground surface and perpendicular to the flight path 14. The slats are spaced slightly above the ground, either on posts 18, as in FIG. 4, or on common rails or other suitable supporting means. As shown the slats are flat metal strips or bars, but could be round rods, or of other cross sections. The spacing between the slats 12, indicated at A in FIG. 3, should be less than one half wavelength of the operating frequency of the radiometer being used, otherwise the dimensions are not particularly critical.

Figure 5:
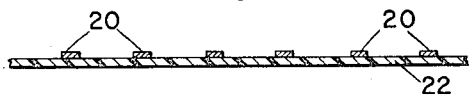
FIG. 5 is a sectional view of an alternative grating structure.

An alternative, very simple form of target is shown in FIG. 5, in which slats 20 are in the form of metallized strips on a backing sheet 22 of plastic material, such as Mylar or other weather and wear resistant material. In this form the target can be put in placed quickly for a temporary landing strip and rolled up after use.

Figure 6:
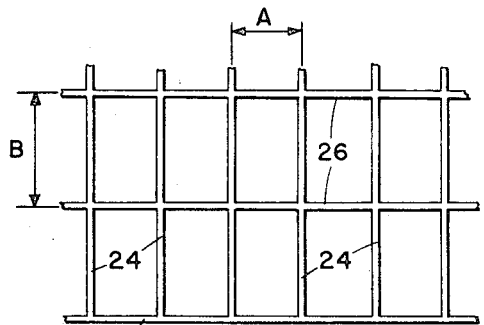
FIG. 6 is a plan view of an alternative grid type of grating.

A further form, shown in FIG. 6, is a grating type structure, with slats 24 joined by longitudinal members 26, which can be a unitary structure or built up. The spacing A between slats 24 is less than one half wavelength, but the spacing B between members 26 must be more than one half wavelength in order to provide the necessary polarization.

Figure 1:
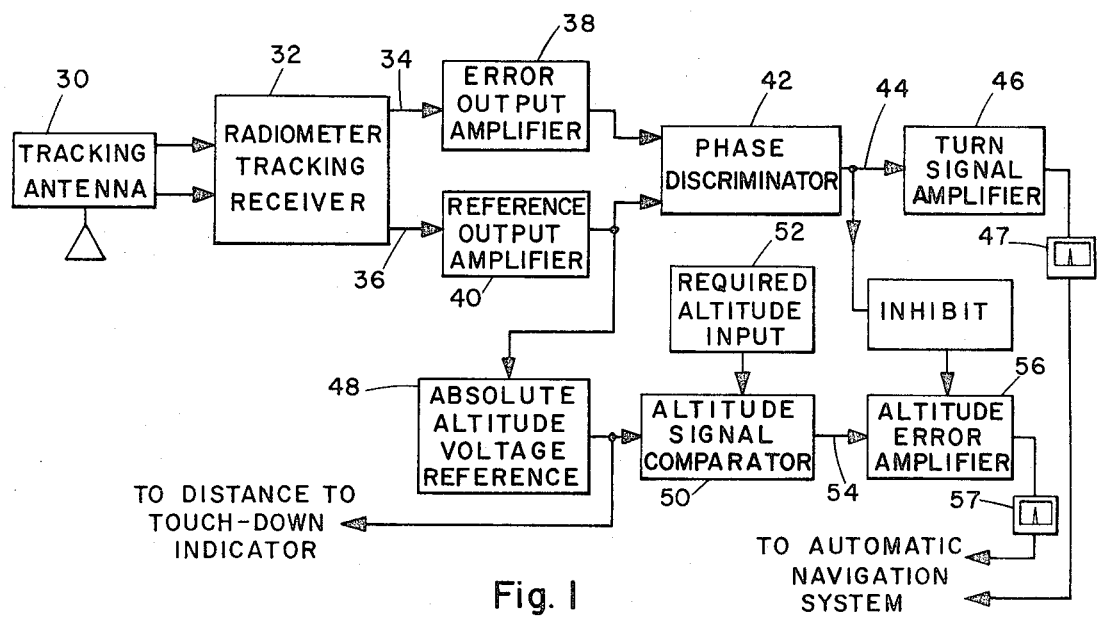
FIG. 1 is a block diagram of the airborne radiometer apparatus.

The airborne radiometer, shown in block diagram form in FIG. 1, is a passive unit which detects radiometric noise given off by virtually all surfaces and objects, the emissivity being a function of the dielectric constant and surface condition of the objects. Radiometric noise covers a very broad spectrum and the radiometer is tuned to respond to a particular frequency band, specifically in the microwave region, the slat spacing of the ground target being made compatible.

The radiometer includes a tracking antenna 30, which may be a conventional monopulse or a conical scanning type, pointed toward the nadir feeding input signals to a receiver 32. The input signals represent the horizontally and vertically polarized radiometric noise and the receiver contains integrating circuitry which provides a difference output 34 and a sum output 36, the technique and circuitry being well known. Output 34 is amplified in an amplifier 38 to provide a useable error signal, and output 36 is amplified in an amplifier 40 to provide a reference signal which represents the total radiometric noise received. Both amplified signals are fed to a phase discriminator 42, the output 44 of which is a turn signal, indicating deviation of the aircraft from flight path 14. The output 44 is fed through an amplifier 46 to the existing autopilot or automatic navigation system in the aircraft, for directional correction of the course. Conventional visual turn indicating means 47 may be used in addition to or instead of the connection to an autopilot, to aid manual control of the aircraft.

Sum output 36 provides an absolute altitude voltage reference 48, representing actual altitude of the aircraft above the terrain. This is applied to a comparator 50, together with a required altitude input voltage 52, which is preset to suit the approach characteristics of the particular airfield. The output of comparator 50 is an altitude error signal 54, which is amplified by an amplifier 56 and fed to the automatic navigation system, or to a suitable visual display 57. With a navigation or autopilot system having descent rate and glide path control, the altitude reference 48 can be applied to the existing distance to touch-down indicator. To avoid unnecessary altitude corrections, an inhibiting circuit 58 is connected between the turn signal output 44 and altitude error amplifier 56, to inhibit an altitude error signal output unless the turn signal output is zero. Thus the altitude is corrected only when the aircraft is on the flight path.

The various components of the radiometer apparatus are all well known and will vary in circuitry according to the frequencies involved. For some purposes an infrared system is practical, but a radar or microwave system may be more desirable for its all-weather capability.

Figure 3:
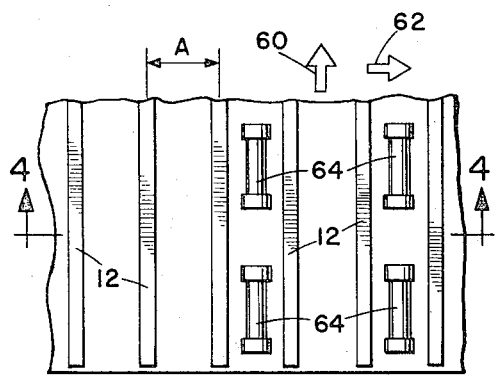
FIG. 3 is an enlargement of a portion of the ground target grating.
Figure 4:
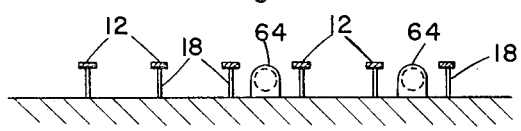
FIG. 4 is a sectional view taken of line 4—4 of FIG. 3.

In operation, the vertically polarized radiation, indicated by directional arrow 60 in FIG. 3, is reflected from the grating and is effectively the same as the sky noise temperature, about 135° K. The horizontally polarized radiation, represented by arrow 62, passes through the grating and assumes the ground noise temperature, about 300° K. With a difference ratio of more than 2 to 1, the system is operable with a completely passive ground target.

Since the radiometer can be designed with good resolution characteristics, contrasting noise areas in specific configurations, such as geometric shapes or alphanumeric characters can be recognized. An oscilloscope type display coupled to the radiometer will provide a visual representation of the noise pattern in some detail. Artificial noise sources 64 may thus be placed between slats 12 in specific patterns, typified by the solid square 66 and hollow square 68 in FIG. 2. The noise sources may be neon or fluorescent lamps, which have plasma radiation detectable by a radiometer. Such augmented noise sources could be used to identify an airfield, or for position markers. In the latter use the effective noise temperature may be selected to provide a specific altitude reference signal to the radiometer at a particular marker, which is an aid in maintaining a proper descent path. While this technique adds active components to the ground target, lamps require little maintenance compared to radio beacons, and characters or symbols are easily changed by selecting different lamps in an array.

The system is thus adaptable to automatic or semi-automatic landing techniques, or as an aid to manual control. Ground targets can be constructed at low cost and are easily set up to facilitate the use of a single type of airborne radiometer unit at any location.

We claim:

1. A radiometric aircraft landing system, comprising:
a radiometer for installation in an aircraft and having an antenna with means for scanning the ground along the flight path;
a ground target extending along the predetermined flight path to a landing strip, said ground target having radiometric noise polarizing elements arranged to provide a high contrast between horizontally and vertically polarized noise relative to the flight path;
said radiometer having a receiver with means to compare the horizontally and vertically polarized noise signals and provide a difference output, and a sum output representing total noise received;
discriminator means connected to said difference and sum outputs and providing a turn error signal;
a source of altitude signal representing required altitude;
comparator means connected to said source and to said sum output and providing an altitude error signal;
and means for utilizing said turn and altitude error signals for control of an aircraft.

2. A radiometric aircraft landing system according to claim 1, and including inhibiting means responsive to said turn error signal to inhibit the altitude error signal when a turn error signal is present.

3. A radiometric aircraft landing system according to claim 1, wherein said ground target comprises a plurality of conductive slat elements spaced along and substantially perpendicular to the flight path.

4. A radiometric aircraft landing system according to claim 3, wherein the spacing between adjacent slat elements is less than one half wavelength of the effective radiometer frequency.

5. A radiometric aircraft landing system according to claim 4, wherein said slat elements are spaced above and substantially parallel to the ground surface.

6. A radiometric aircraft landing system according to claim 4, and including radiometric noise augmenting elements between certain of said slat elements.

7. A radiometric aircraft landing system according to claim 6, wherein said noise augmenting elements are arranged in specific patterns.

8. A radiometric aircraft landing system according to claim 6, wherein said noise augmenting sources are electric lamps.

9. A radiometric aircraft landing system according to claim 1, wherein said ground target comprises a flexible backing sheet transparent to radiometric noise and having a plurality of metallic slat elements thereon in spaced parallel relation along and substantially perpendicular to the flight path.

10. A radiometric aircraft landing system according to claim 1, wherein said ground target comprises a conductive grid having slat elements in spaced parallel relation along and substantially perpendicular to the flight path at a spacing of less than one half wavelength of the effective radiometer frequency, and longitudinal members interconnecting said slat elements with a spacing greater than one half wavelength of the effective radiometer frequency.

* * * * *